United States Patent [19]

Welter et al.

[11] 4,200,494
[45] Apr. 29, 1980

[54] METHOD OF PREVENTING DEFLUIDIZATION OF CARBONACEOUS PARTICLES

[75] Inventors: Charles R. Welter, South Charleston, W. Va.; Barry Liss, New York, N.Y.; Hubert G. Davis, Charleston; Charles W. Albright, South Charleston, both of W. Va.

[73] Assignee: Union Carbide Corporation, New York, N.Y.

[21] Appl. No.: 943,140

[22] Filed: Sep. 18, 1978

Related U.S. Application Data

[63] Continuation-in-part of Ser. No. 712,920, Aug. 9, 1976, which is a continuation of Ser. No. 536,843, Dec. 27, 1974, abandoned.

[51] Int. Cl.$^2$ ............ C10B 57/08; C10B 47/24; C10B 49/10; C10B 49/22
[52] U.S. Cl. ............ 201/9; 48/210; 201/22; 201/28; 201/31; 208/8 R; 208/127; 208/137; 208/157
[58] Field of Search ............ 48/210; 201/9, 22, 28, 201/31; 208/8 R, 127, 137, 157

[56] References Cited

U.S. PATENT DOCUMENTS

| | | | |
|---|---|---|---|
| 2,167,099 | 7/1939 | Benezech | 201/9 |
| 2,577,632 | 12/1951 | Roetheli | 201/31 |
| 2,709,675 | 5/1955 | Phinney | 201/31 |
| 2,881,130 | 4/1959 | Pfeiffer et al. | 208/127 |
| 2,987,465 | 6/1961 | Johanson | 208/10 |
| 3,070,515 | 12/1962 | Sylvander | 201/9 |
| 3,171,369 | 3/1965 | Stephens et al. | 48/206 X |
| 3,551,513 | 12/1970 | Suzukawa et al. | 208/127 |
| 3,617,524 | 11/1971 | Conn | 208/157 |
| 3,927,996 | 12/1975 | Knudsen et al. | 48/210 X |
| 3,988,236 | 10/1976 | Albright et al. | 208/8 R |
| 4,057,512 | 11/1977 | Vadovic et al. | 48/210 X |

Primary Examiner—Barry S. Richman
Attorney, Agent, or Firm—Alvin H. Fritschler

[57] ABSTRACT

Fresh carbonaceous particles are introduced into a fluid-bed reaction zone containing a bed of non-agglomerating particles at an injection velocity in excess of about 200 ft/sec with the fresh particles having been preheated to a temperature within the plastic transformation range of the particles and introduced rapidly and directly into said bed of non-agglomerating particles. The reaction zone may be a hydrocarbonization zone, a carbonization zone, a gasification zone or any other fluid-bed reaction zone in which defluidization may be caused by undue agglomeration of the feed particles. A fluidized stream of the preheated carbonaceous particles may be introduced at said high injection velocity in a vertically upwards direction or otherwise, as from one or more injection points positioned vertically along the side of the reaction zone.

32 Claims, 1 Drawing Figure

METHOD OF PREVENTING DEFLUIDIZATION OF CARBONACEOUS PARTICLES

Cross-Reference to Related Applications

This application is a continuation-in-part of copending U.S. application, Ser. No. 712,920, filed Aug. 9, 1976, which, in turn, was a continuation of U.S. application, Ser. No. 536,843, filed Dec. 27, 1974, now abandoned.

BACKGROUND OF THE INVENTION

1. Field of the Invention

This invention relates to a method of avoiding excessive agglomeration of carbonaceous solid particles so as to prevent defluidization in a fluid-bed reaction zone. More particularly, it is an improved method for injecting fresh carbonaceous particles into a fluid-bed hydrocarbonization, gasification or carbonization reaction zone.

2. Description of the Prior Art

Increasing energy needs have focused attention on solid fossil fuels due to their availability in the United States in a relatively abundant supply and their potential value if converted into more useful forms of energy and feedstock. Processes such as carbonization, gasification, hydrocarbonization and hydrogasification, wherein synthetic fuel products have been prepared by introducing a fluidized stream of finely-divided coal or other solid carbonaceous particles into a fluid-bed reaction zone and reacting the said particles at elevated temperatures in the presence of air, steam, hydrogen or inert gases are well known. A major operating difficulty in such processes has been the tendency of coal or other carbonaceous particles, especially intensified in a hydrogen-rich atmosphere, to agglomerate at the elevated temperature required for reaction.

Coal particles, especially caking, swelling or agglomerating coals, become sticky when heated in a hydrogen-rich atmosphere. Even non-caking, non-swelling and non-agglomerating coals become sticky when heated in such an atmosphere. Coal particles begin to become sticky at temperatures in the range of from about 280° C., commonly from about 350° C. to about 500° C., depending on the specific properties of the coal, the atmosphere and the rate of heating. Such stickiness is due to a tarry or plastic-like material forming at or near the surface of each coal particle, by a partial melting or decomposition process. On further heating over a period of time, the tarry or plastic-like material is further transformed into volatile products and a substantially porous, solid material referred to as a "char." The length of this time period depends upon the actual temperature of heating and is shorter with an increase in temperature. The term "plastic transformation" as used herein refers to such tendency of the surfaces of coal or other carbonaceous particles being heated, particularly when heated in a hydrogen atmosphere, to develop stickiness and transform into substantially solid char, non-sticky surfaces. "Plastic transformation" is undergone by both normally agglomerating coals and coals which may develop a sticky surface only in a hydrogen-rich atmosphere.

Agglomerating or caking coals partially soften and become sticky when heated to temperatures between about 280° C., commonly from about 350° C., to about 500° C. The duration of stickiness depends on the temperature of the coal, being on the order of minutes at the lower end of said range and being exponentially shorter, i.e. down to seconds, at the upper limits of said range. Components of the coal particles soften and gas evolves because of decomposition. Sticky coal particles undergoing plastic transformation tend to adhere to most surfaces which they contact such as walls or baffles in the reactor, particularly relatively cool walls or baffles. Moreover, contact with other sticky particles while undergoing plastic transformation results in gross particle growth through adherence of sticky particles to one another. The formation and growth of these agglomerates interferes drastically with the maintenance of a fluid-bed and excessive growth can make it impossible to maintain fluidization.

In particular, entrance ports and gas distribution plates of equipment used in fluid-bed coal conversion processes become plugged or partially plugged. Furthermore, even if plugging is not extensive, the sticky particles tend to adhere to the walls of the reaction vessel, with continued gross particle growth and the formation of multi-particle conglomerates and bridges interfering with smooth operation and frequently resulting in complete stoppage of operation as a result of defluidization of the bed.

Agglomeration of coal particles upon heating depends on operating conditions such as the heating rate, final temperature attained, ambient gas composition, coal type, particle size and total pressure. Even non-agglomerating coals, such as lignites or coals from certain sub-bituminous seams, are susceptible to agglomeration and tend to become sticky when heated in a hydrogen atmosphere. Thus, agglomeration of coal particles is accentuated in a hydrocarbonization reactor where heating in the presence of a hydrogen-rich gas actually promotes formation of a sticky surface on the coal particles reacted. Introducing any carbonaceous, combustible, solid particles, even those normally non-agglomerating, to a fluid-bed having an atmosphere tending to induce agglomeration can, moreover, result in agglomeration and defluidization of the bed.

Heavy liquid materials are also fed at times to the fluid-bed in coal conversion processes. They may be recycled heavy tar products to be converted to lower molecular weight products, light liquids and gases. Or they may be heavy liquids added from an external source to, for example, enrich the normal gas and/or liquid product, or as a means of waste disposal. Feeding such liquids is known to cause rapid loss of fluidization due to excessive particle agglomeration and plugging.

In an attempt to overcome the problems associated with agglomeration, char as a recycle material from fluidized bed processes has been mixed with an agglomerating type coal feed at a ratio as high as 8 to 1. Also, tar has been ball-milled with a great excess of absorbent char before feeding into a fluid-bed reaction zone. Such procedures reduce the unit throughput, are wasteful of energy and are, therefore, costly. Other attempts have included a pretreatment step wherein coal is oxidized and/or devolatilized superficially in order to prevent sticking and agglomeration of particles, but this lowers the yield of useful products and adds to the overall cost of the operation. Thus, it is highly desirable economically to avoid or at least reduce the extent to which such oxidation pretreatment or such char recycle is employed.

An alternate approach is that suggested by Knudsen et al, U.S. Pat. No. 3,927,996, in which the fines carried overhead by gas from a fluid-bed are monitored and the injection velocity of fresh feed material is regulated in response to changes in the fines content of the gas to produce controlled attrition of agglomerated particles in the fluid-bed. In this approach, a caking coal or other similar carbonaceous solid is introduced into a fluidized bed containing char particles maintained at a temperature in excess of the coal resolidification point by entraining coal particles in a gas stream preheated to a temperature in excess of about 300° F., i.e. about 150° C., but below the initial softening point of the coal. For the gasification of bituminous coals, preheat temperatures up to about 550° F., i.e. about 285° C., are said to be preferred. A fluid-cooled nozzle 16 is employed for feeding the stream of carrier gas and entrained coal particles into the gasifier zone. The injection velocity is regulated between superficial gas velocities as low as 15 feet/second and as high as 1,000 feet/second in response to variations in the fines content of the overhead gas. Such a system necessarily requires continual processing adjustments that are not desirable in continuous, commercial scale operations. In addition, the intermittent high injection velocities of the fresh coal introduced into the fluid-bed under the indicated conditions would generally be considered as having a potential for injection nozzle erosion that, if severe, could lead to a need for premature shutdown for nozzle replacement, adversely affecting the overall effectiveness of the coal conversion operation being carried out in the fluid-bed reaction zone.

A need thus exists in the art for improved methods for treating agglomerating coal or other solid carbonaceous particles in fluid-bed reaction zones. This need resides with respect to the effective injection of fresh particles of such coal or other carbonaceous materials under conveniently controlable conditions capable of avoiding excessive agglomeration of feed particles and thus preventing defluidization of the bed. Such improved methods would desirably avoid the necessity for pretreatment oxidation of the feed particles and/or their admixture with recycle char particles prior to being introduced into the fluid-bed reaction zone. The improvements required for technically and economically feasible coal injection operations must not, on the other hand, introduce peripheral processing disadvantages, such as undue injection nozzle wear, that would adversely affect the overall coal or other solid carbonaceous particle conversion operation.

It is an object of the invention, therefore, to provide a method of preventing excessive agglomeration of carbonaceous feed material in fluid-bed conversion operations.

It is another object of the invention to provide a method of avoiding defluidization in fluid-bed reaction zones employed in coal or other solid carbonaceous conversion operations.

It is another object of the invention to provide a method for employing caking coals on a continuous basis in a continuous fluid-bed reaction zone without defluidization and/or undue equipment plugging problems.

It is a further object of the invention to provide a method for avoiding excessive feed particle agglomeration while, at the same time, avoiding undue injection nozzle erosion.

It is a further object of the invention to provide improvements in the hydrocarbonization process for the preparation of fuel products from coal.

With these and other objects in mind, the invention is hereinafter described in detail, the novel features thereof being particularly pointed out in the appended claims.

SUMMARY OF THE INVENTION

Fresh coal or other solid carbonaceous particles are preheated to a temperature within the plastic transformation temperature range of the particles an are injected rapidly and directly into a fluid-bed of non-agglomerating particles at an injection velocity in excess of about 200 ft/sec. Nozzle erosion is thereby minimized without, at the same time, causing undue agglomeration of the fresh feed particles.

BRIEF DESCRIPTION OF THE DRAWINGS

The invention is hereinafter described in detail with reference to the accompanying single FIGURE drawing constituting a schematic diagram illustrating particular embodiments of the fluid-bed coal conversion system in which the process of the invention is employed to prevent defluidization due to excessive agglomeration of the solid carbonaceous feed material.

DETAILED DESCRIPTION OF THE INVENTION

Figure 1:
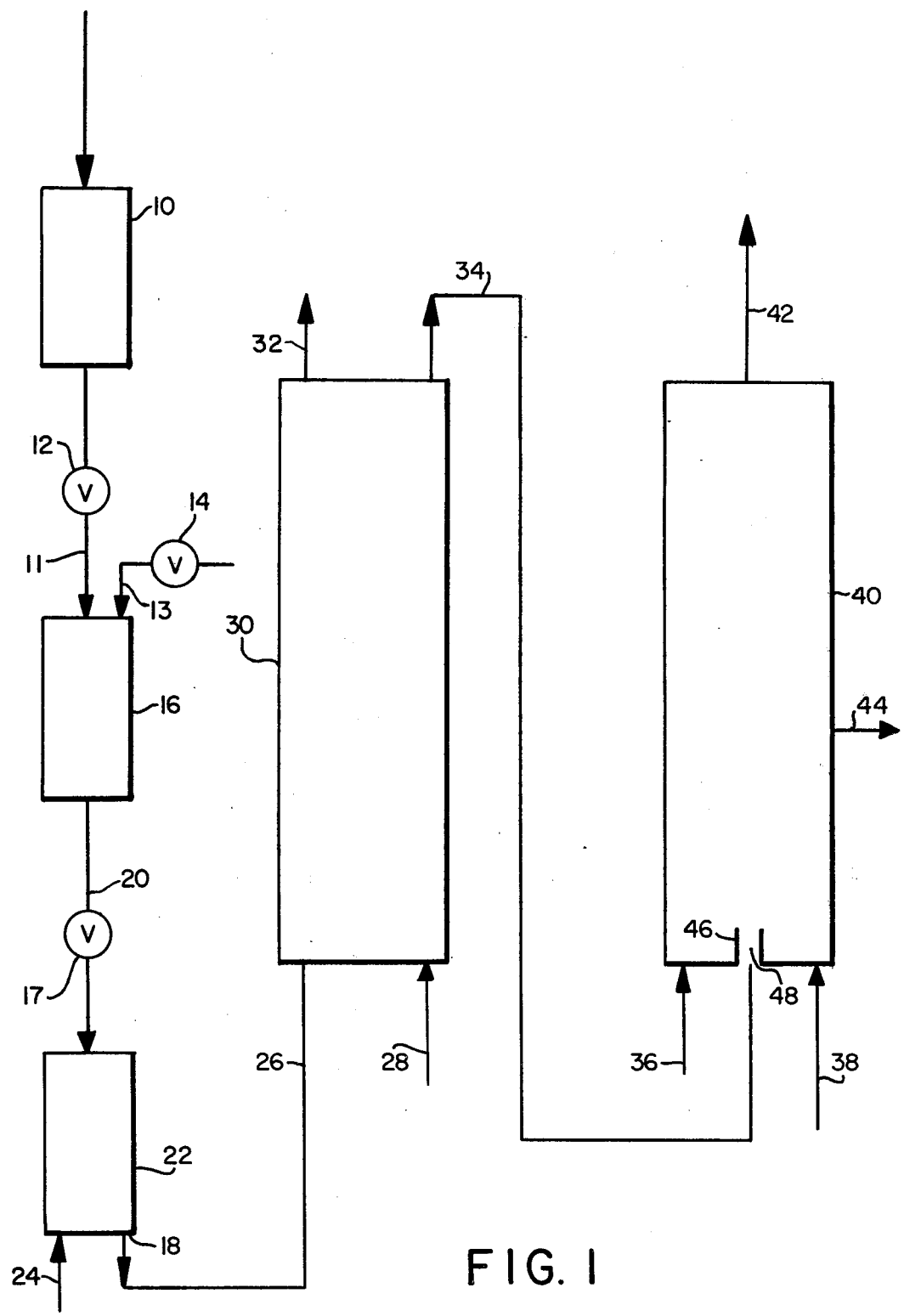

The objects of the invention are accomplished by injecting solid carbonaceous feed particles to a fluid-bed reaction zone at high injection velocities and at preheat temperatures within the plastic transformation range of the particles. Upon being preheated to said range, the particles are thus rapidly and directly injected into the reaction zone containing a fluidized bed of non-agglomerating particles. As described above, the particles form a tarry or plastic-like material at or near the surface of the individual particles upon being heated to a temperature within their plastic transformation temperature range. Particles are not preheated to said range in conventional operations because the stickiness resulting from such formation of a plastic-like material causes undesired agglomeration and the possibility of plugging the entrance ports and gas distribution plates of the equipment, adherence of the sticky particles to the walls of the reaction vessel with the formation of multi-particle conglomerates and bridges interfering with the operation of the bed, and eventual defluidization or bed failure as a result of excessive agglomeration.

It has now been found, surprisingly and contrary to the conventional wisdom of the art, that feed particles may be preheated to a temperature within the plastic transformation temperature range and, at said preheat temperature, rapidly and directly injected into the fluid-bed of non-agglomerating particles at a high injection velocity without excessive agglomeration and resultant defluidization. The lubricity of the thus preheated fresh feed particles, in addition, has been found to minimize nozzle erosion that might be expected at high injection velocities. The high velocity injection of the preheated particles into the reaction zone achieves the desired rapid and uniform dispersion of the feed particles within the fluid-bed of non-agglomerating particles before the stickiness of the particles can result in undue agglomeration. The lubricity of the particles nevertheless results from the formation of said plastic-like material at the particle surface, thereby permitting the high speed injection of the fresh carbonaceous feed material in a carrier gas with little or no erosion of the injection nozzle. As the injection method of the invention obviates the need for admixture of the fresh feed with recycle char to avoid agglomeration, fresh feed injection without recycle char avoids the abrasiveness of the char at high injection velocities and avoids the nozzle erosion that results when a fresh feed-recycle char mixture is injected into the fluid-bed. The invention, therefore, achieves the highly desirable result of avoiding excessive agglomeration leading to defluidization of the bed while, at the same time, minimizing nozzle erosion that would otherwise cause a premature shutdown of the fluid-bed operations for nozzle replacement purposes.

The invention can be employed in the practice of any known fluid-bed coal conversion process in which defluidization and bed failure due to excessive agglomeration may seriously interfere with, or even prevent, effective utilization of such technology on a continuous, commercially feasible basis. One such process is the hydrocarbonization process in which the gaseous reagent for fluidizing the bed and for reaction with fresh solid carbonaceous particles at reaction temperatures of from about 450° C. to about 750° C., preferably from about 500° C., to about 600° C., is a hydrogen-rich, oxygen-free gas. Another such process is the carbonization process in which the reagent comprises carbonization product gases and vapors and essentially inert carrier gas at reaction temperatures of from about 450° C. to about 700° C. A third such process is the gasification process in which solid carbonaceous particles are reacted with steam to form synthesis gas at temperatures generally from about 815° C. to about 1,100° C. It will be appreciated by those skilled in the art that the invention may advantageously be employed in the practice of other such known processes or those subsequently developed so as to avoid excessive agglomeration upon the feeding of fresh carbonaceous solids to a fluid-bed reaction zone.

The fluid-bed reaction zone is conventionally maintained by passing fluidizing medium through finely-divided solid particles. "Introduction velocity" as used throughout the specification means the superficial velocity of carrying gas. By a high velocity is meant a velocity sufficient to rapidly and uniformly disperse fresh coal particles entering the fluid-bed at a temperature below the plastic transformation temperature within a matrix of non-agglomerating particles in the fluid-bed. The non-agglomerating particles contained in the fluid-bed may include inert materials such as ash, sand, recycled char and the like which are inherently non-agglomerating. The non-agglomerating particles are, however, preferably hot, partially reacted coal particles and char particles that have undergone plastic transformation and are situated within the fluid-bed reaction zone at the reaction temperature, e.g. generally above about 450° C. Due to the difference of temperature between the entering coal particles and the reaction zone, heat is ordinarily transferred rapidly from the reaction zone to the entering coal particles, accelerating the plastic transformation process increasing the agglomerating tendency of the feed coal for a brief period of time. It has been found that when the preheated coal is rapidly introduced in the fluid-bed at a high velocity, however, the entering coal particles rapidly and uniformly disperse within a matrix of non-agglomerating particles within the fluid-bed without excessive particle agglomeration.

Introduction of coal particles into the fluid-bed at a high velocity as described hereinabove, promotes rapid, turbulent mixing of the entering particles with the particles circulating in the fluid-bed. This prevents their coherence and defluidization of the bed by imparting sufficient mechanical energy to the reaction zone to break the weaker bonds of the coarser agglomerates, thereby limiting the extent of agglomeration and substantially avoiding defluidization resulting from excessive agglomeration. The entering, sticky or potentially sticky coal particles are rapidly distributed with and brought into intimate association with non-sticky, hot particles situated within the fluid-bed reaction zone. The feed particles, in accordance with the invention, are preheated to a temperature within their plastic transformation range prior to injection into the fluid-bed reaction zone. The hot non-plastic particles or materials at bed temperature transfer heat to the entering feed coal particles. The molten feed coal particles form partial bonds with these dry, hot particles that have previously passed through the plastic transformation temperature range as well as bonding with one another. The extent of average bed particle growth is determined by a dynamic equilibrium in which particle growth is balanced by particle withdrawal and deagglomeration. Coal-to-coal bonds are relatively strong whereas coal-to-char bonds are relatively weak, depending on the extent of solidification which occurs prior to contact of the particles. Two freshly molten coal particles tend to fuse into an indivisible agglomerate, whereas fresh coal would be linked to a char particle by a weaker bond.

With high velocity, high energy injection, rapid dispersion of the entering coal particles occurs, and the fresh particles thus traverse the plastic transformation temperature range with a minimum number of sticky particles contacting one another and at an overall mechanical or kinetic energy input level sufficient to break up the weaker bonds of the coarser agglomerated particles. Consequently, agglomerating or caking coals can be injected into the fluid-bed reaction zone and devolatilized without defluidization occurring as a result of excessive particle agglomeration.

This invention is particularly applicable as an improvement in a hydrocarbonization process utilizing a dense phase fluid-bed. By the term "hydrocarbonization" as employed throughout the specification is meant a pyrolysis or carbonization in a hydrogen-rich atmosphere under such conditions that significant reaction of hydrogen with coal and/or partially reacted coal and/or volatile reaction products of coal occurs. By dense phase as used throughout the specification is meant a concentration of solids in fluidizing gas of from about 5 pounds to about 45 pounds of solids per cubic foot of gas. In a hydrocarbonization process employing a dense phase fluid-bed, the particles in the bed are substantially backmixed, which ensures a near uniform-composition of particles throughout the bed. Since the fluid-bed is in dense phase, fresh coal particles should enter the bed at a velocity sufficient to penetrate and spread rapidly throughout the bed.

The overall mechanical or kinetic energy level necessary and sufficient to prevent excessive particle agglomeration will vary for each particular coal or carbonaceous feed material. The minimum energy required for any particular coal can readily be determined by incrementally decreasing the high injection velocity to the point of bed failure. For such purposes, the bed velocity will conveniently be maintained at a constant rate, with shroud gas being passed through the shroud passages of the injection nozzle at a conventional velocity, e.g.

about 35–100 ft./sec., to keep the nozzle-tip clean and for temperature control purposes. The particular high velocity injection-hot coal conditions employed in the practice of the invention for any such coal may be varied, as will be appreciated by those skilled in the art, depending on the overall energy input of the injection gas, the shroud gas, the bed fluidizing-reagent gas and any attrition jets employed. It will be further appreciated that the energy-to-coal ratio and the gas-to-coal ratio of the overall plant design can be adjusted by a variation of such energy and gas input factors to achieve efficient overall technical and economic performance. The invention, at the particular high velocity coal injection employed, minimizes nozzle erosion by the preheating of the fresh feed to a temperature within its plastic transformation range without, at the same time, causing undue agglomeration of the fresh feed particles.

A velocity rate useful in the method of this invention may be obtained by any suitable means. For example, an inlet nozzle means having a passageway whose cross-sectional area is tapered, narrowed or necked down may be employed to accelerate the coal particles to a high velocity. In addition, process gas may be physically added to the fluidized coal stream as it enters the inlet to the reactor. The addition of process gas increases the flow rate of the fluidized stream and hence the velocity of the coal particles. An amount of process gas sufficient to achieve the desired entrance velocity of coal particles should be used.

Since the fluidized coal particles are transported through the lines in a dense phase flow, a flow or transport rate velocity equivalent to the injection velocity in the reactor is usually unnecessary and undesirable due to the abrasive characteristics of coal. A high velocity flow of coal particles throughout the lines would have required wear plates to be installed throughout the lines to control the otherwise rapid erosion rate of the lines, such wear plates being an undesirable expense. However, according to the present invention, only a small surface area in the immediate vicinity of the reactor, will be exposed to abrasive wear and this part may be replaced readily and economically with little or no downtime of the system.

For example, an inlet means comprising a material having a wear-resistant surface may preferably be employed in this invention as a means for increasing the velocity of coal particles entering the reaction zone and as a means of controlling the manner of entry. Use of such an inlet means lengthens the wear time of the surface exposed to the high erosion rate caused by the high velocity flow of coal particles. Suitable wear-resistant surface may be composed of materials such as tungsten carbide, silicon carbide or other wear-resistant materials known in the art in any combination or mixture thereof. For clarity and illustrative purposes only, the description of this invention will be mainly directed to use of tungsten carbide as the wear-resistant surface of the material that reduced erosion in the lines although any number of other wear-resistant materials can be used successfully according to this invention.

An inlet means such as a nozzle which comprises a transfer line having a reduced or constructed cross-sectional area may be employed in the method of this invention. The length to cross-sectional area ratio of the nozzle should be sufficiently large enough so that the desired velocity of injection for the solid coal particles or non-vaporizable recycle oil may be achieved. A length to cross-sectional area of this section of transfer line of greater than about 5 to 1 is desirable, greater than about 10 to 1 preferable. This allows for a finite distance which the coal particles and/or vaporizable recycle oil require for acceleration to the velocity approaching that of the carrying gas. The feed particles may be introduced into the reaction zone in any convenient direction, i.e. upward, downward, sideways or otherwise. For example, the feed particles may be introduced into the reaction zone from the side thereof in a substantially horizontal, sideward direction. The feed may, furthermore, be introduced into the reaction zone through two or more injection points or nozzles positioned vertically along the side of the reaction zone, including embodiments in which the particles are introduced into the reaction zone through injection points located in essentially opposed positions on the wall of the reaction zone. In certain embodiments, a multiplicity of injection points may be employed. It may also be desirable to withdraw particles from the bottom of the reaction zone.

In particular embodiments of this invention, it is feasible to introduce a fluidized stream of coal feed particles into the lower portion of a substantially vertical fluid-bed reaction zone. More particularly, the feed particles are introduced into the reaction zone through at least one inlet means in a reactor in a vertically upward direction. The inlet means is situated substantially in the vicinity of the vertical axis at or near the reactor borrom. The coal particles are introduced at a velocity sufficient to mix the fresh coal, in some embodiments having a preheat temperature below the plastic transformation-temperature, rapidly with non-agglomerating particles such as partially reacted coal and char particles in the reaction zone at the reaction temperature thereby substantially preventing agglomeration of the fluid-bed.

In a vertical reactor, the natural circulation of coal particles within the fluid-bed reaction zone is a complex flow pattern. However, it may be described approximately by dividing the reaction zone into two concentric sub-zones, an inner sub-zone and an outer sub-zone surrounding the inner sub-zone. In the inner sub-zone which is situated substantially within the axially central portion of the reactor, coal particles flow in a generally ascending path. In the outer sub-zone which is situated substantially near the walls of the reactor, coal particles flow in a generally descending path. Advantages of introducing the coal particles into the fluid-bed through the bottom of the reactor in an essentially vertically upwards direction are that the natural circulation of coal particles in the fluid-bed is enhanced and that the coal particles get at least a minimum residence time. Introduction of coal particles into the fluid-bed through the bottom of the reactor promotes a channeled circulation of particles within the reaction zone along the natural circulation path. Circulation eddies, are thus enhanced and promote the dispersion of the entering coal particles with a matrix of non-agglomerating particles within the fluid-bed reaction zone.

The fluidized coal particles should be introduced into this inner sub-zone, the central upflow zone within the reactor. The central upflow zone extends radially from the vertical axis of the reactor to an area where the outer sub-zone, the peripheral downflow zone begins. It is essential that the coal particles be introduced into the central upflow zone in order to avoid striking the walls of the reactor or entering the peripheral downflow zone. The coal particles may be introduced through the base or bottom of the reactor at one or more inlets situated in the vicinity of the point where the vertical axis of the reactor intersects the base of the reactor.

To minimize injection nozzle erosion without, at the same time, causing excessive particle agglomeration, the coal or other carbonaceous feed particles are preheated to a temperature within the plastic transformation temperature range, which varies for different feed materials but is generally in the range of from about 280° C. to 400° C., commonly in excess of about 325° C., e.g. from about 340° C. to about 375° C. The reaction temperature within the fluid-bed reaction zone is generally maintained above about 450° C. for known coal conversion processes with such temperatures being generally from about 500° C. to about 750° C., commonly from 500° C. to about 600° C. in hydrocarbonization. At high injection velocities, particularly in excess of about 400 ft./sec., the mechanical energy input is sufficient to break down the weaker bonds of the coarser agglomerates, thereby substantially preventing excess agglomeration and defluidization despite the preheating of the feed particles to a temperature within their plastic transformation temperature range prior to being rapidly and directly injected into the reaction zone at such high injection velocities.

It has been discovered that introducing a fluidized stream of coal particles into a dense phase, fluid-bed reaction zone at a velocity of more than about 200 feet per second in a manner described hereinabove substantially prevents excessive agglomeration or caking of the fluid-bed by the imparting of sufficient mechanical energy to the reaction zone to break up the coarser agglomerates and to rapidly and uniformly disperse the fresh particles within the bed. When a lower injection velocity, for example, about 100 feet per second is used, without other modifications from conventional practice, agglomeration of the fluid-bed is not prevented. In order to substantially prevent agglomeration of the fluid-bed reaction zone, coal should be introduced at a high velocity into the zone in a high velocity, high kinetic or mechanical energy stream, i.e. at a velocity more than about 200, and preferably more than about 400, feet per second, corresponding to an energy-to-coal ratio of at least about $10 \times 10^{-4}$, preferably at least about $40 \times 10^{-4}$, horsepower-hours per pound of coal introduced. The energy-to-coal ratio, as referred to herein, is the ratio of the kinetic horsepower (in the injection jet as calculated by the adiabatic expansion of the feed mixture) to the coal feed rate. "Reaction zone" as used throughout the specification is meant to include that area wherein carbonaceous, combustible, solid and sometimes liquid particles, are reacted to form char, liquid and/or vapor fuel products in coal conversion processes such as carbonization, gasification and dry hydrogenation (hydrocarbonization). A zone of reaction can also be referred to by the name of the process e.g., hydrocarbonization zone is the reaction zone in a hydrocarbonization process.

This invention is applicable to the various coal conversion processes mentioned hereinabove. For example, a hydrocarbonization process can be improved to handle both agglomerating and/or non-agglomerating coals in a continuous manner and maintain fluidization of the fluid-bed. In a hydrocarbonization process, a dense phase flow of coal particles may be passed through a preheating zone before entering a fluid-bed hydrocarbonization zone wherein the coal particles are rapidly heated in the presence of a hydrogen-rich, essentially oxygen-free gas, to an elevated temperature above about 450° C. where the desired reactions can occur. The improvement according to this invention comprises introducing the preheated fluidized coal particles into the fluid-bed, through the bottom of a hydrocarbonization zone in an essentially vertically upwards direction or otherwise as herein provided, at a high velocity. This rapidly brings the entering coal particles to a non-sticky, high temperature, partially reacted state without their contacting too many coal particles also traversing the plastic transformation-temperature range. The preheated, particulate coal in a fluidized state is introduced, in some embodiments, into a fluid-bed hydrocarbonization zone in a vertically upwards direction as described hereinabove at a velocity of more than about 200 feet per second and more preferably at a velocity of more than about 400 feet per second.

Coals have been classified according to rank as noted in the following table, Table A:

TABLE A.

Classification of Coals by Rank.[a]
(Legend: F.C. = fixed carbon; V.M. = volatile matter; B.t.u. = British thermal units)

| Class | Group | Limits of fixed carbon or B.t.u., ash free basis |
|---|---|---|
| I. Anthracite | 1. Meta-anthracite | Dry F.C., 98% or more (dry C.M., 2% or less) |
| | 2. Anthracite | Dry F.C., 92% or more and less than 98% (dry V.M., 8% or less and more than 2%) |
| | 3. Semianthracite[b] | Dry F.C., 86% or more and less than 92% (dry V.M., 14% or less and more than 8%) |
| II. Bituminous[d] | 1. Low-volatile bituminous coal | Dry F.C., 78% or more and less than 86% (dry V.M., 22% or less and more than 14%) |
| | 2. Medium-volative bituminous coal | Dry F.C., 69% or more and less than 78% (dry V.M., 31% or less and more than 22%) |
| | 3. High-volatile A bituminous coal | Dry F.C., less than 69% (dry V.M., more than 31%) |
| | 4. High-volatile B bitu- | Moist[c] B.t.u., 13,000 or |

TABLE A.-continued

Classification of Coals by Rank.[a]
(Legend: F.C. = fixed carbon; V.M. = volatile matter; B.t.u. = British thermal units)

| Class | Group | Limits of fixed carbon or B.t.u., ash free basis |
|---|---|---|
| | | minous coal more and less than 14,000[c] |
| | 5. High-volatile C bituminous coal[f] | Moist B.t.u., 11,000 or more and less than 13,000[c] |
| III. Sub-bituminous | 1. Sub-bituminous A coal | Moist B.t.u., 11,000 or more and less than 13,000[c] |
| | 2. Sub-bituminous B coal | Moist B.t.u., 9,500 or more and less than 11,000[c] |
| | 3. Sub-bituminous C coal | Moist B.t.u., 8,300 or more and less than 9,500[c] |
| IV. Lignitic | 1. Lignite | Moist B.t.u., less than 8,300 |
| | 2. Brown coal | Moist B.t.u., less than 8,300 |

[a]This classification does not include a few coals that have unusual physical and chemical properties and that come within the limits of fixed carbon or B.t.u. of the high-volatile bituminous and sub-bituminous ranks. All of these coals either contain less than 48% moisture and ash free fixed carbon or have more than 15,500 moist, ash free B.t.u.
[b]If agglomerating, classify in low volatile group of the bituminous class.
[c]Moist B.t.u. refers to coal containing its natural bed moisture but not including visible water on the surface of the coal.
[d]It is recognized that there may be noncaking varieties in each group of the bituminous class.
[e]Coals having 69% or more fixed carbon on the dry, mineral-matter-free basis shall be classified according to fixed carbon, regardless of B.t.u.
[f]There are three varieties of coal in the high-volatile C bituminous coal group, namely, Variety 1, agglomerating and non-weathering; Variety 2, agglomerating and weathering; Variety 3, nonagglomerating and non-weathering.
Source: A.S.T.M. D388-38 (ref. 1).

Agglomerating coals, such as most bituminous and some sub-bituminous coals, are strongly agglomerating in a hydrogen atmosphere. They can not be handled conventionally without a pretreatment step. These coals may now be handled without an injurious degree of defluidization by the process of this invention alone or in combination with a pretreatment step, if necessary. If a pretreatment step is necessary, the needs for pretreatment are milder and cost less. For example, at present even after heavy pretreatment, the use of a highly agglomerating coal such as Pittsburgh Seam Coal in a hydrocarbonization process presents the problem of agglomeration occurring in the fluid-bed. However, it is beneficial to use the process of this invention to overcome this agglomerating problem. Those skilled in the art will recognize that any number of suitable pretreatment steps may be applied in combination with the process of this invention for the handling of coals which are either highly agglomerating or highly agglomerating in a hydrogen-containing atmosphere. These pretreatment steps include, for example, but are not limited to, chemical pretreatment such as oxidation or mixing with inert solids such as recycle char.

The manner in which the invention is carried out will be more fully understood from the following description when read with reference to the accompanying drawing which represents a semi-diagrammatic view of an embodiment of a system in which the process of this invention may be carried out.

FIG. 1 illustrates coal supply vessels 10 and 16, a coal feeder 22, a preheater 30 and a reactor vessel 40. Lines are provided for conveying finely divided coal through the vessel in sequence. A line 26 conveys the coal from the pick up chamber 18 to the preheater 30. A line 34 conveys the coal from preheater 30 into the reactor vessel 40. A line 44 conveys devolatized coal (termed "char") from the reaction vessel 40 for recovery as solid product or for recycle. A line 42 is provided for conveying liquid and vapor products from the reaction vessel 40 for further processing and/or recycle.

According to the process of this invention, the feed coal is in particulate form, having been crushed, ground, pulverized or the like to a size finer than about 8 Tyler mesh, and preferably finer than about 20 Tyler mesh for lower rank coals while finer sizes, e.g. -60 mesh US, are employed for bituminous coals. Furthermore, while the feed coal may contain absorbed water, it is preferably free of surface moisture. Coal particles meeting these conditions are herein referred to as "fluidizable." Any such absorbed water will be vaporized during preheat. Moreover, any such absorbed water must be included as part of the inert carrying gas and must not be in such large quantities as to give more carrying gas than required.

The coal supply vessels 10 and 16 each can hold a bed of fluidizable coal particles, which are employed in the process. Coal supply vessel 10 is typically a lock-hopper at essentially atmospheric pressure. Coal supply vessel 16 is typically a lock-hopper in which fluidized coal can be pressurized with process gas or other desired fluidization gases.

Operation of vessels 10, 16 and 22 can be illustrated by describing a typical cycle. With valves 14 and 17 closed, lock-hopper 16 is filled to a predetermined depth with coal from lock-hopper 10 through open valve 12 and line 11 at essentially atmospheric pressure. Then, with valves 12 and 17 closed, lock-hopper 16 is pressurized to a predetermined pressure above reaction system pressure through open valve 14 and line 13. Valves 12 and 14 are then closed and coal is introduced into fluidized feeder vessel 22 through open valve 17 and line 20. The cycle about lock-hopper 16 is then repeated. A typical time for such a cycle is from about 10 to about 30 minutes. With valve 17 closed, fluidized coal is fed at a predetermined rate through line 26 to the downstream-process units. Other variations of the feeding cycle to the fluidized feeder are possible, of course, but they are not illustrated herein since they do not form the inventive steps of this process.

In fluidized feeder 22, a fluidizing gas passes through line 24 at a low velocity sufficient to entrain the fluidizable coal and convey it in dense phase flow through line 26 and into the bottom of coal preheater 30, or directly to line 34 if no preheat is required. Alternately, additional gas could be added to the line conveying the coal in a dense phase flow through line 26 to assist in the conveyance. Any non-oxidizing gas can be used as the fluidizing gas, e.g. fuel gas, nitrogen, hydrogen, steam and the like. However, it is preferable, in general, to use reaction process gas or recycle product gas.

Coal preheater 30 is a means to rapidly preheat, when desirable, the finely divided coal particles, under fluidized conditions, to a temperature below the minimum temperature for softening or significant reaction range, in the substantial absence of oxygen. The maximum allowable temperature of heating is in the range of from about 325° C. to about 400° C., depending on the feed material employed where preheating to below the plastic transformation temperature range is employed. Preheating to below about 300° C. is common in such embodiments. The stream of gas-fluidized coal in dense phase is heated upon passing rapidly through the heater having a very favorable ratio of heating surface to internal volume. The coal is heated in the heater 30 to the desired temperature by any convenient means of indirect heat exchange; e.g., by means of radiant heat or a hot flue gas such as depicted in FIG. 1 as entering the bottom of heater 30 through line 28 and exiting at the top of the heater 30 through line 32.

Preheated fluidized coal particles exit the preheater 30 through line 34 and enter at or near the bottom of the reactor vessel 40 substantially near the center of the bottom. In this illustrated embodiment, the coal particles are introduced into the fluid-bed reaction zone through the reactor bottom at a high velocity. This high velocity may be achieved by accelerating the fluidized stream of coal particles to the desired velocity by addition of an accelerating gas and/or along a constricted path of confined cross-section. A nozzle, narrow inlet port, tapered channel or any inlet means which narrows, constricts or necks down the cross-sectional area of the passageway to the inlet where the fluidized coal particles enter the reactor may be used to accelerate the fluidized stream of particles to the desired velocity. The stream of preheated, fluidizable coal particles is introduced into the central upflow zone of the fluid-bed within the reaction vessel at the high velocity in an essentially vertically upwards direction, preferably through the bottom of the reaction vessel.

Recycle oil may also be fed into reactor 40 through line 36. Injection of the recycle is also preferably at a stream velocity of about 200 feet per second or greater, and more preferably about 400 feet per second or greater into the central upflow zone of the fluid-bed of the reactor through the bottom of the reactor vessel in an essentially vertically upwards direction. Like the entering coal particles, the recycle oil stream follows a substantially ascending path about a substantially axially central portion of the reaction vessel. In the injection of the recycle oil and fluidizable coal particles, it is essential that they be introduced into the reactor vessel in such a way that they do not immediately and directly strike the walls of the reactor vessel, a result which could lead to unnecessary and undesirable agglomeration.

Only one inlet each for entry of the preheated coal particles and the recycle oil is shown in FIG. 1. These inlets may also represent a multiplicity of inlets for ease of operation of this process. A multiplicity of inlets may be desirable, for example, where the reactor is large, or when separate recycle streams of oil are being injected into the reactor. The entry points for the coal particles and/or recycle oil are preferably situated near the point where the vertical axis intersects the reactor bottom. Each stream of coal particles and/or recycle oil is preferably introduced at a high velocity at each inlet in an essentially vertically upwards direction, the inlets situated in or near the reactor bottom substantially near the point where the vertical axis intersects the reactor bottom. In this manner, the separate streams of entering carbonaceous materials are kept separate and apart until rapidly mixed in the fluid-bed with partially reacted coal and char particles.

The entering carbonaceous materials are reacted with a suitable reagent in the reaction zone at a temperature above about 450° C. or 500° C.

Char from reactor vessel 40 is continuously removed through line 44.

Liquid and vapor products are removed from the reactor vessel 40 through line 42. Fluidization gas is fed into the reactor vessel 40 through line 38, the type gas depending on the type process involved. For example, steam or steam and oxygen are fed into a gasifier in a gasification process; a non-reacting gas is fed into a carbonizer in a carbonization process; and a hydrogen-containing, substantially oxygen-free gas is fed into a hydrocarbonizer in a hydrocarbonization process.

As disclosed herein, further advantages unappreciated heretofore in the art are obtained by preheating fluidized coal particles in preheater 30 to a temperature essentially within the plastic transformation temperature range of the particles. The thus preheated particles exit preheater 30 through line 34 and pass rapidly and directly to the bottom of reactor vessel 40 substantially near the center of the reactor bottom in the embodiment shown in the drawings. The coal particles are introduced into the fluid-bed reaction zone at a high injection velocity, the lubricity of the fresh feed material at the higher than conventional preheat temperature tending to minimize undesired nozzle erosion while the rapid and direct injection of the particles into the reaction zone precludes excess agglomeration of particles and resultant defluidization. As noted above, it will be appreciated in the art that, in other embodiments of the invention, the fresh feed particles can be introduced into reactor 40 in any other direction. In particular embodiments, the injection points may be located in essentially opposed positions on the wall of reactor 40 for further turbulent mixing. In other embodiments, the feed material may be passed through line 34 for downward injection into reactor 40. It will also be understood that reactor 40 may be constructed with a lower reaction zone, an enlarged upper zone and a cone-like transition zone, the upper zone having a lower bed velocity facilitating separation of gaseous materials from the bed and minimizing undesired carry-over of fines in the gaseous effluent stream. It will be further understood that the feed inlet nozzle means will be positioned substantially at the wall of the reaction vessel, e.g. substantially at the bottom of the reaction zone in the embodiment shown in the drawing, but may extend somewhat into said zone. In the illustrated embodiment, inlet nozzle means 46 may extend, for example, 2 ft. or more upward into the reaction zone. The injection point need not extend appreciably into the interior of the fluid-bed region, however, as is required in the Phinney patent, U.S. Pat. No. 2,709,675 which relates to low speed coal injection, preferably in conjunction with a draft-tube positioned within the fluid-bed reaction zone. Shroud gas is passed in a conventional manner through shroud passage 48 to maintain the nozzle tip clean and free of clogging problems and to prevent overheating of the coal.

The following examples are illustrative of the concept of this invention, demonstrating the method of preventing agglomeration of coal in fluidized bed processes via the high velocity injection of coal particles into a reaction zone.

EXAMPLE I

The apparatus employed, shown schematically in the drawings, comprised two coal feed lock-hoppers (10,16) connected in parallel to a fluidized feeder 22, a preheater 30 and reactor 40. The entire coal conveying line was constructed of ⅜-inch I. D. by ½-inch O. D. tubing. The two coal feed lock-hoppers (10, 16) that fed the fluidized feeder alternately each had a 7-inch I. D. and height of 8 feet. The fluidized feeder 22 had a 24-inch I. D. and h height of 20 feet. The preheater 30, a lead bath heated by "surface combustion" burners had a 24-inch I. D. and height of 12 feet. The reactor 40 had an 11-inch I. D. fluid-bed, a bed depth of 17½ feet an outside cross-sectional area of 0.66 sq. ft.

The average velocity through the dense phase coal feed line was not particularly high, the maximum velocity being approximately 40 feet per second at the inlet to the reactor and only 15 feet per second at the outlet of the coal feeder, erosion of the pipe at these velocities still remaining at an acceptable level. Attempts to feed the coal into the reactor at velocities of approximately 100 feet per second resulted in agglomeration and coking-up of the fluid-bed. A 15/32-inch diameter tungsten-carbide nozzle was used to increase the rate at which the fluidized coal-hydrogen stream was introduced into the reactor to 200 feet per second and provide an erosion resistance surface.

In operation, the reactor was filled with coal and slowly heated up toward the target conditions and gas flows and pressures were established. Hydrogen was employed as the gas phase. When the target conditions were established the coal feed was begun. On the termination of the run the reactor was opened up. No large agglomerates or coke particles were found. Operating conditions during the hydrocarbonization are shown in Table I below:

TABLE I

| | LAKE DE SMET COAL (Operating Conditions) | | | |
|---|---|---|---|---|
| Run Number | 1 | 2 | 3 | 4** |
| Reactor Pressure | 500–600 psig. | 600 psig. | 400–1000 psig. | 700 psig. |
| Reactor Temperature | *470° C.–520° C. | *470° C.–520° C. | 480° C. to 570° C. | 520° C.–560° C. |
| Fluidization Velocity | 0.5 ft/sec | 0.5 ft/sec | 0.25 ft/sec–0.5 ft/sec | 0.5 ft/sec |
| Coal Feed Rate | 1000–1200 lb/hr | 1000–1200 lb/hr | 600–1000 lb/hr | 1000 lb/hr |
| Feed Gas to the Reactor | Hydrogen | Hydrogen | Hydrogen | Hydrogen |
| Length of Run | 45 hours | 34 hours | 78 hours | 29 hours |
| Coal Stream Injection Velocity | 200 ft/sec | 200 ft/sec | 200 ft/sec | 200 ft/sec |
| Nominal Solids Residence time in bed | 18–22 minutes | 18–24 minutes | 19–46 minutes | 9.4 minutes |

*Initially 470° C. and increased in 10° C. increments every 6 hours with the added restriction that the reactor was cooled to 450° C.–470° C. after a coal feed stoppage and before starting the coal feed again.
**Bed depth of the reactor was shortened to 7 ft. 2 inches for this run. The analysis of the feed, is summarized in TABLE II below:

TABLE II

| LAKE DE SMET COAL, WYOMING, SUBBITUMINOUS C (ANALYSIS) | |
|---|---|
| Moisture and Ash Free Basis | Weight Percent |
| C | 72.0 |
| H | 5.3 |
| N | 1.3 |
| S | 1.0 |
| O | 20.4 |
| Ash | 11.9 (dry basis) |
| Water | 30 (as received) |

EXAMPLE II

Two additional runs were conducted employing apparatus and procedures similar to those employed in Example I, except that oil, the higher boiling fractions (all product boiling above 235° C.) of the liquid product, was recycled to the reactor. These additional runs were conducted to determine whether a high velocity injection of heavy oil could be fed to the reactor without agglomerating the fluid-bed. The oil recycle equipment added to the pilot plant apparatus comprised a storage tank, to hold the recycle oil, an oil preheater to preheat the oil prior to injection into the reactor.

The main hydrogen stream to the reactor was split into two roughly equal streams, each of which was preheated to 300° C. to 350° C. The heavy recycle oil was pumped into one of these hydrogen streams and injected into the reactor through a ¼-inch diameter tungsten carbide nozzle at a stream velocity of approximately 400 feet per second. The nozzle, which pointed vertically up the reactor, was located in the center of the reactor bottom 5 feet above the coal inlet. The other hydrogen stream was mixed with preheated coal, and introduced into the bottom of the reactor through a 15/32-inch diameter tungsten-carbide nozzle at approximately 160 feet per second in a vertically upwards direction. The data for these runs are summarized below in Table III.

TABLE III

| Run | 1 | 2 |
|---|---|---|
| Coal Feed Rate | 1000 lb./hr. | 1000 lb./hr. |
| Coal Feeder Pressure | 1100 psig. | 1100 psig. |
| Reactor Pressure | 500 psig. | 500 psig. |
| Reactor Temperature | 550 C | 580 C |
| Reactor Fluidization Velocity | 0.5 ft./sec. | 0.5 ft./sec. |
| Length of Run | 5 hrs. | 5 hrs. |
| Recycle Oil Feed Rate | 100 lb./hr. | 240 lb./hr. |

TABLE III-continued

| Run | 1 | 2 |
|---|---|---|
| Coal - H₂, Inlet Velocity | 160 ft./sec. | 160 ft./sec. |
| Oil - H₂, Inlet Velocity | 420 ft./sec. | 420 ft./sec. |

No problems were encountered in making these runs. There was no evidence of agglomeration in the fluid-bed, even when injecting oil at the 240 lb./hr. rate.

EXAMPLE III

The bench-scale apparatus employed in this example comprised a pulverized solid hopper having a solid's capacity of 4.5 liters and constructed from a 3-inch diameter by 4-foot high schedule 80 carbon steel pipe; a reactor was made of 1-inch I. D. by 9-inch high stainless steel tube having a ¼-inch wall thickness and an expanded head 4-inches high and 2 inches I. D.; solids overflow line constructed of ½-inch Schedule 40 pipe; a vapor line constructed from ¼-inch O. D. stainless steel tubing; and a solids feeder. Two liquid feed pumps, Lapp Microflow Pulsafeeders were used, one to feed the liquid being investigated and the other to feed water for steam generation. Electrically heated liquid and water vaporizers and superheaters constructed of ¼-inch O. D. stainless steel tubing were installed between the feed pumps and the feed injection nozzle to the reactor. Thermocouples located 3, 6, 8 and 11-inches from the bottom of the reactor were installed in a ¼-inch O.S. thermowell placed axially in the center of the reactor. The lower three thermowells were in the fluidized bed while the upper thermocouple was in the vapor space above the bed.

In operation, tars boiling about 235° C. obtained from hydrocarbonization of Lake de Smet Coal were employed as the feedstock to the reaction zone for conversion to oils boiling below 230° C. The tars were distilled from the whole liquid product obtained from the hydrocarbonization into various distillation fractions and a blend of these distillation fractions used in this example had a nominal atmospheric temperature range for 75% of the tar between 235° C. and 460° C. The remaining 25% boiled above 460° C.

The solids feed hopper was filled with Lake de Smet hydrocarbonization char as described hereinabove. The water and tar feed reservoirs were filled and heated to operating temperature. During the heat up period, a predetermined flow of hydrogen passed through the empty reactor. As soon as operating conditions were approached, the char feed and water feed (superheated steam by the time it entered the reactor through the injection orifice) were started. The three thermocouples located in the fluidized bed, at the levels indicated hereinabove, served as an indication of bed behavior. Attempts to feed this tar stream at velocities of 100, 200 and 300 feet per second resulted in rapid agglomeration of the fluidized reactor bed. A 26-gauge hypodermic needle used was to achieve a 400 feet per second injection velocity of the whole tar feed. Using this inlet velocity for the whole feed, coking up of the fluidized bed within the reactor was prevented under the following operating conditions contained in Table IV.

TABLE IV
OPERATING CONDITIONS - LAKE DE SMET COAL

| | |
|---|---|
| Pressure | 150 psig. |
| Hydrogen Partial Pressure | 115 psig. |

TABLE IV-continued
OPERATING CONDITIONS - LAKE DE SMET COAL

| | |
|---|---|
| Residence time of Vapors in Char Bed Based on Superficial Linear Velocity | 1.33 sec. |
| Char Feed | 250 g/hr. |
| Oil Feed Rate | 2 ml/min. |
| Water (as steam) Feed | 3 ml/min. |
| Hydrogen Flow to Reactor | 35 SCFH |
| Moles Hydrogen/Moles Oil | 45/1 |
| Temperature | 650° C. |
| Superficial Linear Velocity of Hydrogen | 0.5 ft./sec. |
| Rim of Run | 5 hrs. |
| Fluidizing Gas | Hydrogen |

EXAMPLE IV 100 pounds per hour of Pittsburgh No. 8 seam coal, −20 mesh, are introduced into a low temperature, fluidbed reactor for pyrolysis at a reactor temperature of 540° C. to obtain liquid products, gaseous fuel and dry char. Pittsburgh No. 8 seam coal is a highly swelling, agglomerating, high volatile A bituminous coal. Nominal residence time of the coal and the product char in the reactor bed is 15 minutes. When the coal is introduced into the reactor bed with recycled product gas at a coal and gas injection velocity of 20 feet per second, agglomeration of the reactor bed begins immediately. Within 30 minutes, the bed is highly agglomerated so that no fluidization occurs and no further coal can be injected as a practical matter.

However, when fresh coal is introduced into the fluidbed reactor at injection velocities of 200, 300 and 400 feet per second, respectively, a fluid-bed at a reaction temperature between about 500° C. and about 700° C. is maintained without substantial agglomeration. The fresh entering coal rapidly mixes with the partially carbonized coal (char) circulating in the bed, so that as the fresh coal particles undergo plastic transformation and become sticky, the fresh coal particles primarily see particles which have already undergone plastic transformation and are now non-sticky. Carbonization products, gases, tars and other liquids, water and char are continuously withdrawn from the carbonization reactor.

EXAMPLE V

In an agglomerating ash gasifier of the type described in U.S. Pat. No. 3,171,369, 1000 pounds per hour of fresh Pittsburgh No. 8 seam coal, −60 mesh, is gasified at a temperature between about 816° C. and about 1000° C. with steam. Heat is provided by circulation to the gasifier of about 12,000 pounds per hour of agglomerated ash particles from a char fired, fluid-bed combustor. When the fresh coal is injected into the fluid-bed of ash and partially reacted coal, at a velocity of 20 feet per second with steam, partial agglomeration occurs. Large aggregates of char are formed which cannot be separated from the ash agglomerates and poor fluidization and soon poor thermal efficiency results. It is essential to the operation of the process that the coal, as it carbonizes and gasifies, remains free-flowing and finely-divided.

When the velocity of the injected Pittsburgh No. 8 coal and steam is increased to 400 feet per second, dispersion within the fluid-bed is excellent. No significant agglomeration occurs and separation of the fine char formed and the larger denser particles of agglomerated ash is readily accomplished. The introduction of the fresh coal into the fluidized, generally descending bed of hot agglomerated ash, at a velocity of 400 feet per second, occurs at a point near the bottom of the bed, but somewhat above the bottom to avoid carry-down of coal or char by the recycling ash. Injection is in a generally vertical and upward direction. This promotes great turbulence of ash, coal and char near the points of introduction, which disperses the coal throughout the bed and effectively prevents agglomeration.

EXAMPLE VI

The advantages of the novel high injection velocity-hot coal embodiments of the invention were demonstrated by introducing Illinois No. 6 coal, without recycle char and without pretreatment oxidation, upwardly into a fluid-bed hydro-carbonization reaction zone at an injection velocity of from about 400 to about 480 ft./sec., said feed coal having been preheated to a carrier gas/coal mixture temperature of about 390°–400° C., i.e. within the plastic transformation temperature range of said coal. The initial softening point of the coal was about 325°–350° C. The coal particles, which were 60–70% −200 mesh, were fed to the reaction zone over a 3–4 hr. period, with the coal feed rate being slowly increased from 10 to 22 lb. of coal/hr. The injection gas/coal rate decreased from 67 to 34 scf (standard cubic feet) of gas per pound of coal. Gas was passed through the shroud passage of the injection nozzle at about 70 ft./sec., corresponding to a kinetic energy/-coal ratio of $0.1 \times 10^{-4}$ hp-hr./lb. of coal. The injection nozzle was located 20" above the grid at the bottom portion of the reaction zone. No attrition jets were employed. The bed velocity at the bottom of the reaction zone was varied from about 1.6 to about 2.0 ft./sec., the bed density at this portion of the zone varying from about 13 to about 7.3 lb./ft$^3$ over the range of the coal feed rate given above. Three inches from the top of said zone, the bed velocity varied from about 2.3 to about 2.8 ft./sec., with the bed density being in the range of 8 to 11 lbs./ft$^3$. The reactor employed had an enlarged upper zone and a cone-like transition zone, with the upper zone having a lower bed velocity to facilitate separation of gases from solids without excessive carry-over of fines. The bed velocity in said upper zone ranged from 0.60 to 0.68 ft./sec. with the bed density being 13–14 lbs./ft$^3$. No defluidization or bed failure was encountered. Rapid dispersion of the feed particles with the char in the fluid-bed reaction zone, together with deagglomeration due to the mechanical or kinetic energy supplied to the reaction zone, served to maintain the average bed size in a range suitable for fluidization. The kinetic energy of the high velocity injection gas was sufficient, therefore, to avoid excessive agglomeration and to control particle size within the reaction zone to a range that could be fluidized. Despite the high injection velocity, no observable erosion of the injection nozzle occurred. By contrast, a run carried out at 600 ft./sec. with a feed comprising ½ part recycled char per part of fresh coal was observed, at an entrance gas plus coal mixture temperature of about 323° C., to cause a 0.005" nozzle erosion after 1½ hr. at said injection velocity. Nozzle erosion is a point of concern, therefore, particularly when recycle char is mixed with the fresh coal. As indicated above, however, nozzle erosion and the premature shut-down of operations for nozzle replacement can be avoided by employing high velocity fresh coal injection, substantially without recycle char, at temperatures within the plastic transformation temperature range of the particles. The hot coal has a lubricity when heated to such range, thereby minimizing abrasion and resulting nozzle erosion. The fresh, preheated particles are injected rapidly and directly into the fluid-bed reaction zone and into direct contact with the non-agglomerating particles therein. Under such conditions, undue or excessive agglomeration of the fresh feed particles is avoided despite the operation at preheat temperatures avoided in the art because of the agglomeration that would occur at conventional operating conditions.

EXAMPLE VII

In operations utilizing the reactor system of Example VI above, the indicated Illinois No. 6 coal was injected into the hydrocarbonization reactor at an initial injection velocity of 392 ft./sec. at a gas plus coal injection temperature of 375° C., which is within the plastic transformation temperature range of the coal particles. The coal feed rate was about 24–27 lbs./hr., with the injection gas/coal feed rate being reduced from an initial 31 to 21 scf of gas per pound of coal. The injection velocity was thus decreased incrementally from said 392 to 295 ft./sec. No attrition jets were employed. Injection nozzle shroud gas was employed at a shroud gas velocity of 55 ft./sec., having a shroud kinetic energy of $0.1 \times 10^{-4}$ hp.-hr./lb. of coal, to keep the nozzle tip clean and to avoid overheating of the feed particles. The bed velocity at the bottom of the reaction zone was 1.5 ft./ft./sec. with a bed density of 13 lbs./ft$^3$. 3" from the top of said zone, the bed velocity was about 2.0–2.1 ft./sec., with the bed density at this point ranging from about 7.9 to about 9.8 lbs./ft$^3$. In the enlarged upper zone, bed velocity was reduced to 0.55 ft./sec. at a bed density of 14 lbs./ft$^3$. Excessive agglomeration was avoided under such conditions and no noticeable erosion of the injection nozzle occured. Bed failure resulted, due to defluidization caused by excessive particle agglomeration, when the injection velocity was reduced to below 300 ft./sec.

It should be noted that excessive agglomeration and defluidization are not prevented simply by a high fresh feed injection velocity, but by such a high injection velocity of carrier gas and fresh coal or other carbonaceous particles at such quantities, or loading levels, as to provide sufficient mechanical or kinetic energy to assure that excessive agglomeration and resulting defluidization are prevented. Under the conditions of EXAMPLE VII, for example, bed failure occurred when the injection velocity was reduced to below 300 ft./sec. and the available power for controlling the size of particles was inadequate at the loading level pertaining to the fluid-bed reaction zone in this instance. The invention has been employed, in other examples, with Pittsburg No. 8 as the feed coal to achieve the desirable and unique combination of results herein disclosed and claimed.

The invention represents a highly significant advance in the art of feeding caking coals or other carbonaceous materials to fluid-bed coal conversion operations. The invention enables high velocity injection of such materials to be carried out while nozzle erosion is minimized. Despite the avoidance in the art of preheat temperatures within the plastic transformation temperature range of the particles, the invention enables such temperatures to be used to advantage to minimize nozzle erosion leading to premature shut-down of operations. Such unique preheat temperatures are employed in conjunction with high velocity coal injection, without the necessity for admixture with recycle char and/or oxidation pretreatment, at kinetic energy levels such as to substantially prevent defluidization in the reaction zone despite the preheating of the feed particles to their plastic transformation temperature range. Sufficient mechanical energy is thus imparted to the reaction zone to break up the coarser agglomerates that may form and to rapidly and uniformly disperse the fresh feed particles within the fluid bed of non-agglomerating particles within the reaction zone. In addition to the minimizing of nozzle erosion while substantially avoiding agglomeration, the invention provides desirable operating flexibility and advantages overcoming the economic disadvantage of high gas/coal ratios associated with high injection velocity operations. At the temperature of the coal and gas injection mixture as restricted to below the initial softening point, i.e. below the plastic transformation range, of the coal in conventional practice, addition of gas in excess of that required to convey the coal to the reactor, as in high velocity injection, would impose a thermal burden on the reactor system. Thus, the thermal energy balance around the reactor in such circumstances would require a hotter feed temperature for the remaining gas, such as the fluidizing-reagent gas as more of the total gas input to the system would be used to provide the dilute, easily dispersible, high velocity fresh coal injection jet. This consideration would be of particular importance in hydrocarbonization where the heat of reaction is only slightly exothermic.

As the relative ratio of the relatively cold injection gas to hot gas is increased, a point is reached at which the additional heat that the hot gas is required to supply will call for temperatures that cannot be handled without the use of expensive alloys for the hot gas preheater and the transfer line to the reaction zone. Operating with the injection mixture above the initial softening point temperature of the coal and at the high injection velocities employed in the practice of the invention, the advantages associated with a diluter injection jet, both in terms of dispersion and deagglomeration efficiency, can be achieved while minimizing the thermal burden on the reactor. The process of the invention enhances the technical and economic feasibility of desirable coal conversion operations, provides advantageous flexibility in meeting the overall heat and material balance limitations of commercial plant designs, and constitutes a major advance in the important efforts to develop practical technologies for the use of caking coals in meeting the ever-increasing energy requirements of modern industrial societies.

What is claimed is:

1. A method of substantially preventing defluidization due to excessive agglomeration of solid carbonaceous particles in a fluid-bed reaction zone maintained at a reaction temperature above about 450° C. and containing a bed of non-agglomerating particles at the reaction temperature, said method comprising:
   (a) introducing fresh solid carbonaceous particles in a carrier gas into said reaction zone at an injection velocity in excess of about 200 ft./sec., said solid carbonaceous particles having been pre-heated to a temperature essentially within the plastic transformation temperature range of said particles and being injected rapidly and directly into said reaction zone and into direct contact with the non-agglomerating particles therein;
   (b) introducing a gaseous reagent into said reaction zone for fluidizing said bed and for reaction with said fresh solid carbonaceous particles at said reaction temperature within said zone, whereby said solid carbonaceous particles are rapidly and uniformly dispersed within said bed of non-agglomerating particles so that undue agglomeration of said fresh solid carbonaceous particles and consequent bed failure are avoided, the relatively hot, fresh solid carbonaceous particles tending to minimize nozzle erosion at the high injection velocities employed.

2. The method of claim 1 in which said injection velocity is in excess of about 400 ft./sec.

3. The method of claim 1 in which said fluid-bed comprises a dense phase fluid bed.

4. The method of claim 1 in which said solid carbonaceous particles are preheated in a dense phase prior to being introduced into said reaction zone.

5. The method of claim 1 in which said injection velocity is in excess of about 400 ft./sec.

6. The method of claim 1 in which said solid carbonaceous particles are introduced into the lower portion of the reaction zone in an essentially vertically upwards direction.

7. The method of claim 6 in which said solid carbonaceous particles are introduced into said reaction zone in the substantially axially central portion thereof.

8. The method of claim 6 in which said solid carbonaceous particles are introduced through an injection point substantially at the bottom of said reaction zone.

9. The method of claim 1 in which said preheat temperature essentially within the plastic transformation range of the fresh solid carbonaceous solids is from about 280° C. to about 400° C.

10. The method of claim 9 in which said injection velocity is in excess of about 400 ft./sec.

11. The method of claim 9 in which said preheat temperature is from about 340° C. to about 375° C.

12. The method of claim 9 in which said solid carbonaceous particles are preheated in a dense phase prior to being introduced into said reaction zone.

13. The method of claim 1 in which said reaction zone is a carbonization zone, and said reagent comprises carbonization product gases and vapors and essentially inert carrier gas.

14. The method of claim 13 in which said reaction temperature is between about 500° C. and about 700° C.

15. The method of claim 13 in which said injection velocity is in excess of about 400 ft/sec.

16. The method of claim 13 in which said preheat temperature essentially within the plastic transformation range of said solid carbonaceous particles is from about 280° C. to about 400° C.

17. The method of claim 1 in which said reaction zone is a gasification zone, and said reagent comprises steam.

18. The method of claim 17 in which said reaction temperature is from about 815° C. to about 1000° C.

19. The method of claim 17 in which said injection velocity is in excess of about 400 ft./sec.

20. The method of claim 17 in which said preheat temperature essentially within the plastic transformation range of said solid carbonaceous particles is from about 325° C. to about 400° C.

21. The method of claim 1 in which said solid carbonaceous particles are introduced into the reaction zone from the side thereof in a substantially horizontal, sideward direction.

22. The method of claim 21 in which said fluid-bed comprises a dense phase fluid bed.

23. The method of claim 21 in which said solid carbonaceous particles are introduced into the reaction zone through a plurality of injection points positioned along the side of said reaction zone.

24. The method of claim 23 in which solid carbonaceous particles are introduced into the reaction zone through injection points located in essentially opposed positions on the walls of the reaction zone.

25. The method of claim 1 in which said solid carbonaceous particles comprise fresh coal particles, said non-agglomerating particles comprise partially reacted coal and char particles, said reaction zone is a hydrocarbonization zone, said reagent is a hydrogen-rich, oxygen-free gas and said reaction temperature is from about 450° C. to about 750° C.

26. The method of claim 25 in which said reaction temperature is from about 500° C. to about 600° C.

27. The method of claim 25 in which said reaction temperature is from about 650° C. to about 750° C.

28. The method of claim 25 in which said preheat temperature essentially within the plastic transformation range of the fresh coal is from about 280° C. to about 400° C.

29. The method of claim 25 in which said coal injection velocity is in excess of about 400 ft./sec.

30. The method of claim 29 in which said fresh coal particles are preheated in a dense phase prior to being introduced into said reaction zone.

31. The method of claim 30 in which said coal particles are introduced into the reaction zone through an injection point on the side wall of the reaction vessel.

32. The method of claim 31 in which said coal particles are introduced into the reaction zone through a plurality of injection points.

* * * * *